(12) United States Patent
Tondra et al.

(10) Patent No.: US 7,237,299 B2
(45) Date of Patent: Jul. 3, 2007

(54) CLEANING MACHINE HAVING A CONTROL SYSTEM FOR CLEANING A SURFACE

(75) Inventors: Aaron P. Tondra, North Canton, OH (US); Evan A. Gordon, Canton, OH (US)

(73) Assignee: The Hoover Company, North Canton, OH (US)

( * ) Notice: Subject to any disclaimer, the term of this patent is extended or adjusted under 35 U.S.C. 154(b) by 527 days.

(21) Appl. No.: 10/431,707

(22) Filed: May 8, 2003

(65) Prior Publication Data

US 2004/0221415 A1    Nov. 11, 2004

(51) Int. Cl.
*A47L 11/30* (2006.01)

(52) U.S. Cl. .......................... 15/320; 15/319
(58) Field of Classification Search ............ 15/319, 15/320, 340.1, 340.2, 340.3, 340.4
See application file for complete search history.

(56) References Cited

U.S. PATENT DOCUMENTS

| | | | | |
|---|---|---|---|---|
| 4,667,364 A | | 5/1987 | Meili ........................ | 15/320 |
| 4,675,935 A | | 6/1987 | Kasper et al. | |
| 5,357,649 A | * | 10/1994 | Hasegawa et al. ......... | 15/320 |
| 5,389,344 A | | 2/1995 | Copeland et al. .......... | 422/264 |
| 5,411,716 A | | 5/1995 | Thomas et al. ............ | 422/264 |
| 5,505,915 A | | 4/1996 | Copeland et al. .......... | 422/264 |
| 5,636,402 A | * | 6/1997 | Kubo et al. ................ | 15/98 |
| 5,735,959 A | | 4/1998 | Kubo et al. ................ | 118/663 |
| 6,176,940 B1 | | 1/2001 | Wang ........................ | 134/21 |
| 6,446,302 B1 | | 9/2002 | Kasper et al. .............. | 15/319 |
| 6,671,925 B2 | * | 1/2004 | Field et al. ................ | 15/320 |
| 6,800,140 B2 | * | 10/2004 | Hansen ...................... | 15/320 |
| 2002/0083548 A1 | | 7/2002 | Hansen ...................... | 15/319 |
| 2002/0129459 A1 | * | 9/2002 | Gergek ....................... | 15/320 |

FOREIGN PATENT DOCUMENTS

| | | | |
|---|---|---|---|
| JP | 5-68661 | * | 3/1993 |
| JP | 5-305047 | | 11/1993 |
| JP | 6-30865 | * | 2/1994 |

OTHER PUBLICATIONS

English translation of Japanese patent 5-305047.*
British Patent Office Search Report relating to British Patent Application No. GB0617559.0 and dated Sep. 21, 2006. This Search Report cites the above-identified Thomas patent, as well as two other patents already of record in the present U.S. Patent Application.

* cited by examiner

*Primary Examiner*—Terrence R. Till
(74) *Attorney, Agent, or Firm*—A. Burgess Lowe, Esq.; Brett A. Schenck, Esq.

(57) ABSTRACT

A cleaning apparatus for cleaning a surface in which cleaning solution is dispensed to the surface and substantially simultaneously extracted along with the dirt on the surface in a continuous operation is provided. The cleaning apparatus further includes a detecting device for detecting the speed of the cleaning apparatus as it moves along the surface and producing a speed signal representing the speed of the cleaning apparatus relative to the surface. A controller, operatively connected to the detecting device and a component on the cleaning apparatus, controls the function of the component based on the speed signal. The controller can also control the function of the component based on a signal representing other operating characteristics of the cleaning machine.

22 Claims, 5 Drawing Sheets

CLEANING MACHINE HAVING A CONTROL SYSTEM FOR CLEANING A SURFACE

BACKGROUND OF THE INVENTION

1. Field of the Invention

The present invention relates to a cleaning machine having a control system for cleaning a surface.

2. Background Information

It is known to have cleaning machines for cleaning a surface. One example of a cleaning machine is a carpet extractor that distributes cleaning solution to a cleaning surface and substantially simultaneously extracts it along with the dirt on the carpet in a continuous operation. It would be desirable to control certain cleaning operations of the extractor based on certain operating characteristics of the extractor. For example, when cleaning the surface using such an extractor, less cleaning solution is distributed on areas of the cleaning surface over which the extractor moves very quickly.

Likewise, extractors with agitators do not agitate those areas of the cleaning surface as much since less time is spent agitating those areas. The same situation applies to the degree of suction. Also, it would be desirable to vary the mix ratio of detergent and clean water in the cleaning solution to compensate for the change in speed of the extractor moving over the surface. Thus, it would be desirable to uniformly clean the surface using these cleaning functions irrespective of the speed of the extractor as it moves along a surface. Also, these or other cleaning functions could be controlled based on the extractor speed or other operating characteristics of the extractor.

Hence, it is an object the present invention to provide a cleaning machine that controls certain cleaning operations of the extractor based on certain operating characteristics of the extractor.

It is another object of the present invention to provide a cleaning machine that more uniformly cleans the cleaning surface.

SUMMARY OF THE INVENTION

The foregoing and other objects of the present invention will be readily apparent from the following description and the attached drawings. In one aspect of the invention, a cleaning apparatus for cleaning a surface in which cleaning solution is dispensed to the surface and substantially simultaneously extracted along with the dirt on the surface in a continuous operation is provided. The cleaning apparatus includes a base assembly that moves along the surface. A liquid distribution system is associated with the base assembly and includes a source providing a supply of cleaning solution to a distributor fluidly connected to the source. A liquid recovery system is also associated with the base assembly and includes a suction nozzle having an inlet located at the front portion of the base assembly. A suction source is in fluid communication with the suction nozzle for applying suction to draw the cleaning solution and dirt from the surface through the suction nozzle. The cleaning apparatus further includes a detecting device for detecting the speed of the cleaning apparatus as it moves along the surface and producing a speed signal representing the speed of the cleaning apparatus relative to the surface. A controller, operatively connected to the detecting device and the liquid distribution system, controls the amount of cleaning solution distributed to the surface based on the speed signal.

In another aspect of the invention, a cleaning apparatus for cleaning a surface in which cleaning solution is dispensed to the surface and substantially simultaneously extracted along with the dirt on the surface in a continuous operation is provided. The cleaning apparatus includes a base assembly that moves along the surface. A liquid distribution system is associated with the base assembly and includes a source providing a supply of cleaning solution to a distributor fluidly connected to the source. A liquid recovery system is also associated with the base assembly and includes a suction nozzle. A suction source is in fluid communication with the suction nozzle for applying suction to draw the cleaning solution and dirt from the surface through the suction nozzle. An agitator is operatively connected to the base assembly The cleaning apparatus further includes a detecting device for detecting the speed of the cleaning apparatus as it moves along the surface and producing a speed signal representing the speed of the cleaning apparatus relative to the surface. A controller, operatively connected to the detecting device and the agitator, controls the speed of the agitator agitating the surface relative to the base assembly based on the speed signal.

In still another aspect of the invention, a method for cleaning a surface with a carpet extractor is provided and includes the steps of moving the carpet extractor along the surface, detecting an operating characteristic of the carpet extractor, distributing a predetermined amount of cleaning solution from the carpet extractor based on the operating characteristic of the carpet extractor, and recovering the cleaning solution and dirt form the surface using the carpet extractor.

BRIEF DESCRIPTION OF THE DRAWINGS

The invention will now be described, by way of example, with reference to the attached drawings, of which.

DETAILED DESCRIPTION OF THE INVENTION

Figure 1:
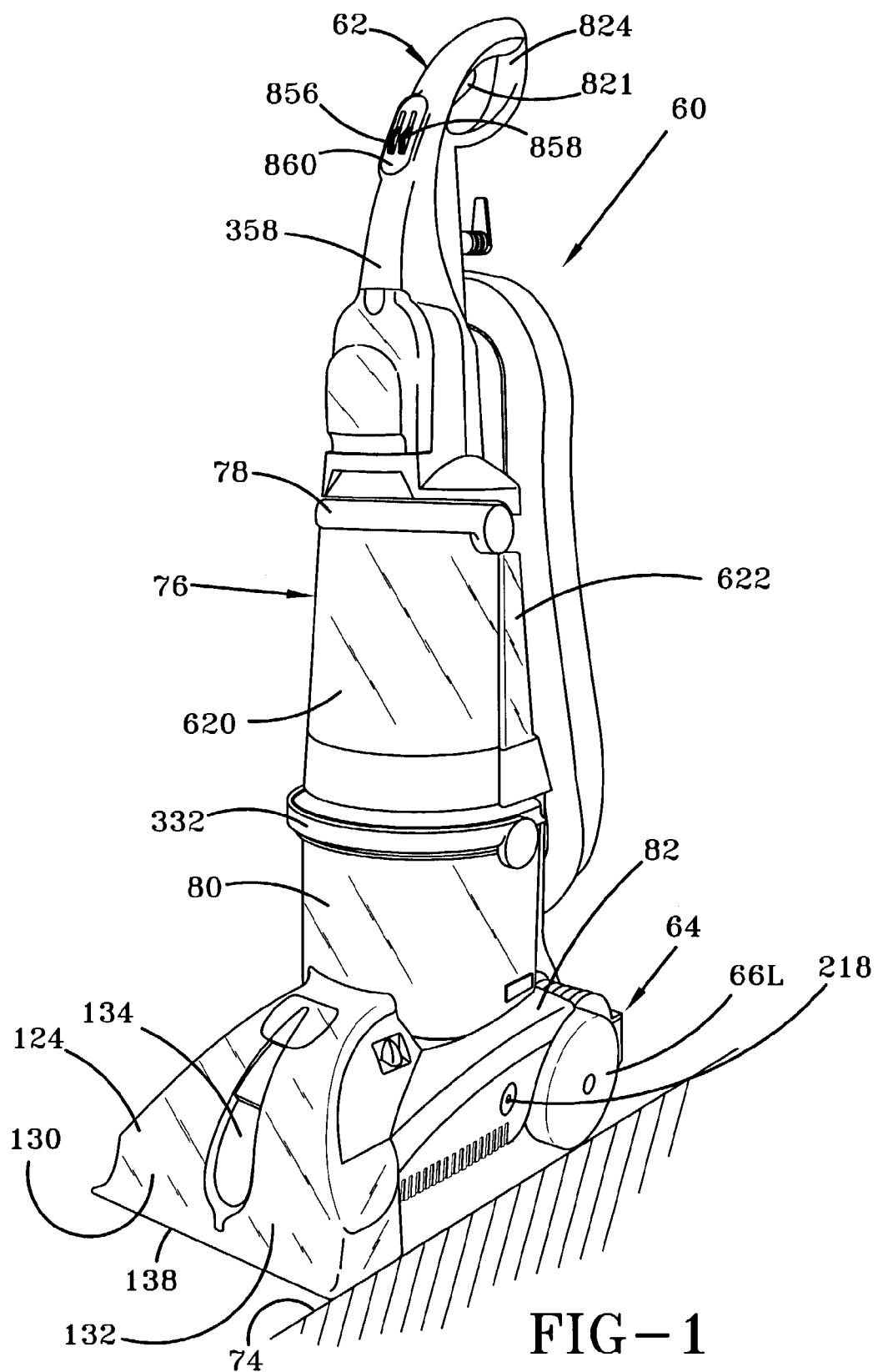
FIG. 1 is a perspective view of a carpet extractor embodying the present invention.

Referring to the drawings, FIG. 1 depicts a perspective view of an upright carpet extractor 60 according to one embodiment of the present invention. The upright carpet extractor 60 comprises an upright handle assembly 62 pivotally connected to the rear portion of the floor-engaging portion or base assembly 64 that moves and cleans along a surface 74 such as a carpet or bare floor. The base assembly 64 includes two laterally displaced wheels 66 (only the left wheel 66L being shown) rotatably attached thereto. A supply or solution tank assembly 76 is removably mounted to the handle portion 62 of the extractor 60. A combined air/water separator and recovery tank 80 with carrying handle 332 removably sets atop a suction motor/fan assembly 81 (FIG. 2) of the base assembly 64 and is surrounded by a hood portion 82. A floor suction nozzle assembly 124 is removably mounted t the hood portion 82 of the base assembly 64 and is in fluid communication with the recovery tank 80 for transporting air and liquid into the recovery tank 80. The floor suction nozzle assembly 124 extends forwardly down to the front portion of the base assembly 64. The floor suction nozzle assembly 124 includes a front plate secured to a rear plate that in combination define dual side ducts 130, 132 separated by a tear drop shaped opening 134. The suction nozzle assembly 124 has an inlet 138 located forwardly adjacent the front end of the base assembly 64. Further details of the above mentioned elements of the carpet extractor are disclosed in a co-pending application having Ser. No. 10/165,731, now abandoned; the disclosure being incorporated herein by reference.

Figure 2:
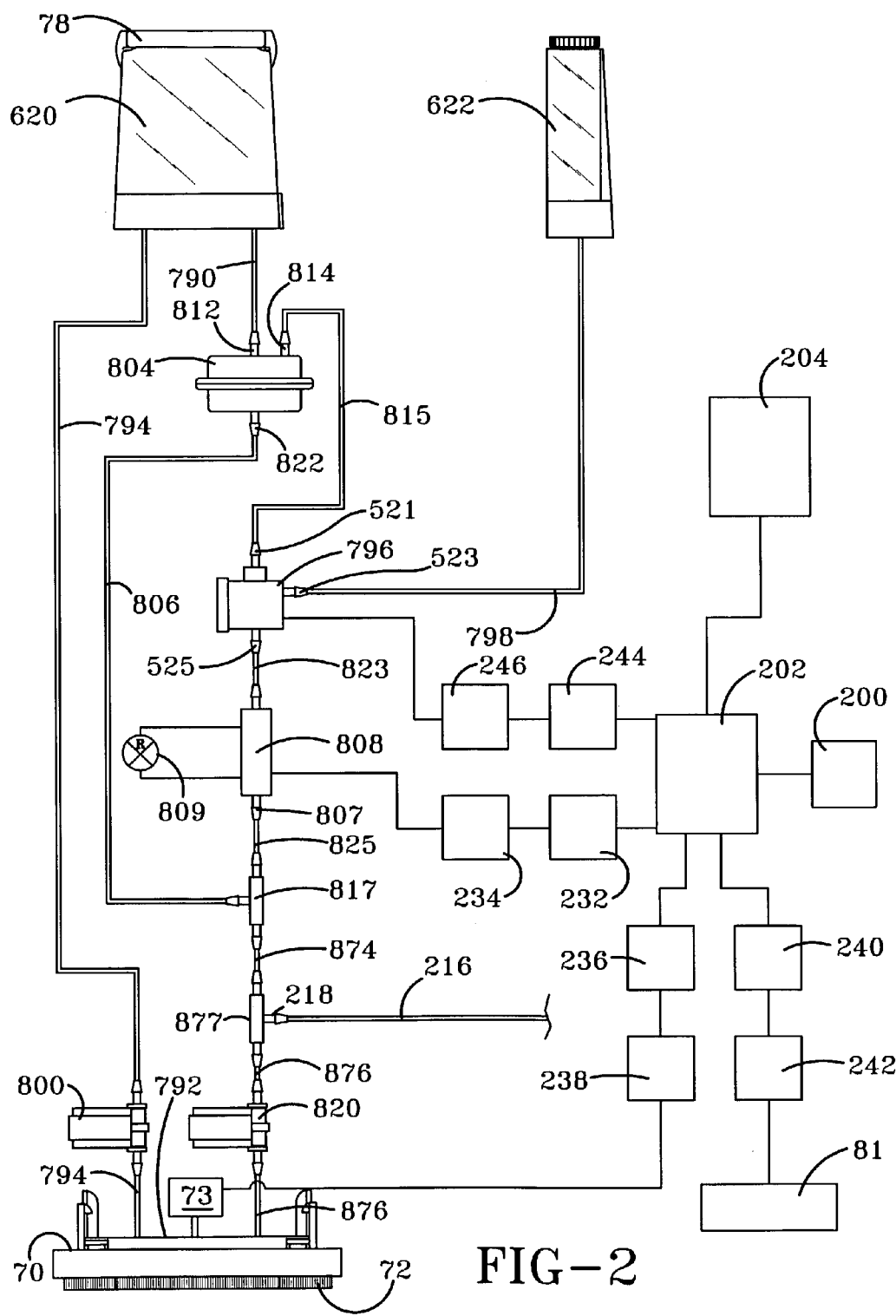
FIG. 2 is a schematic view of the fluid distribution system and control system of the embodiment shown in FIG. 1.

As depicted in FIG. 2, the base assembly 64 includes a brush assembly 70 having a plurality of rotating scrub brushes 72 for scrubbing the surface. A suitable brush assembly 70 is taught in U.S. Pat. No. 5,867,857, the disclosure of which is incorporated herein by reference. Brush assembly 70 is operated by a suitable gear train (or other known means). An electric motor 73 with a gear assembly drives the gear train on the brush. One such suitable electric motor is disclosed as best illustrated in FIG. 24 in U.S. Pat. No. 6,832,409, the entire disclosure of which is incorporated by reference. Other brush assemblies could be also used such as, for example, a horizontal brush roll or a vibrating or oscillating type brush assembly.

The supply tank assembly 76 comprises a clean water supply tank 620 and a detergent supply tank 622 adhesively mounted to the clean water supply tank 620 as depicted in FIG. 1. The supply tank assembly 76 includes a combination carrying handle and tank securement latch 78 providing a convenient means for carrying the tank and/or securing the tank to the extractor handle assembly 62.

With reference to FIG. 2, the carpet extractor 60 includes a solution hose 794 that fluidly connects the outlet of the clean water tank 620 to a shut off valve 800 used for selectively turning on and off the flow of clean water. Another solution hose 790 fluidly connects the outlet of the water tank 620 to an inlet 812 of a pressure actuated shut off valve 804. The outlet of the detergent tank 622 is fluidly connected to the inlet 523 of a mixing valve 796 via a suitable flexible hose 798.

The pressure actuated shut off valve 804 is fluidly connected between the clean water tank 620 and the mixing valve 796 for turning off and on the flow of water. This shut off valve 804 is opened and closed by outside pressure via a conduit 806 connected between it and the outlet 807 of a pump 808 through a Tee 817. The valve 804 includes a pressure port 822 fluidly connected to the outlet 807 of a pump 808. The outlet of the valve 814 is fluidly connected to the inlet 521 of the mixing valve 796 via hose 815. It should be known that clean water tank 620 could be fluidly connect to the outlet 814 of the valve 804 with the inlet 812 of the valve 804 being fluidly connect to the mixing valve 796 so that fluid could flow the opposite direction if desired.

In operation, when the pressure at the pressure port 822 is below a predetermined value such as between 7 to 10 psi, the valve 804 opens to allow water to flow in both directions. Such a pressure value at the pressure port 822 occurs when the main shut off valve 820 is opened and the pump 808 is turned on. The pump 808 also pressurizes the water mixed with detergent to draw it to the distributor 792. When the pressure exceeds a second predetermined value such as between 20 to 30 psi, the valve 804 closes. This would occur if the main shut off valve 820 is closed and the pump is turned on. Thus, with the valve 804 closed, clean water or detergent is prevented from flowing through it. Various types of pumps can be used such as a gear pump or centrifugal pump.

The outlet 525 of the mixing Tee 796 is fluidly connected via flexible hose 823 to the inlet of the pump 808, which provides pressure to draw the cleaning solution to the distributor 792, when it is turned on. A relief valve 809 is fluidly connected across the pump 808 to limit the pressure at the outlet 807 of the pump 808 to a predetermine value. The outlet 807 of the pump 808 is fluidly connected to the main shut off valve 820 via flexible hoses 825, 874 and 876. Both of the shut off valves 800, 820 are in the form of a solenoid valve, however, other electrical actuated valves could be also used.

The valves 800, 820 are operated by a trigger switch 821 as depicted in FIG. 1. The trigger switch 821 is pivotally connected to the upper handle portion 358 approximately near a closed looped handgrip 824. Slide switch 858 is used to select one of the shut off valve 800, 822 to be opened and closed by the trigger switch 821. Slide switch 856 is the main power switch, which turns on and off the suction motor 81, pump 808, and brush motor 73. Alternatively, a separate switch could be incorporated to turn on and off the brush motor independent of the main power switch. The water or detergent mixed with water cleaning solution from the tanks 620, 622 flows to their associated shut off valves 800, 820. The cleaning liquid distributor 792 evenly distributes the cleaning liquid to each of the rotary scrub brushes 72. The scrub brushes 72 then spread the cleaning liquid onto the carpet (or bare floor), scrub the cleaning liquid into the carpet and dislodge embedded soil. A solution discharge valve 877 allows mixed detergent and clean water to flow through an integrally formed nipple 218 and a detachable solution tube 216 to a hand-held cleaning attachment (not shown) and dispense by typical spray means.

As is commonly known, a user pivots the handle 62 in an incline position while moving the carpet extractor 60 over the surface to clean it. The carpet extractor 60 distributes the cleaning solution to the carpeted surface using the brushes 72 and substantially simultaneously extracts it along with the dirt on the carpet in a continuous operation. In particular, soiled cleaning liquid is extracted from the carpet by the suction nozzle 124 and transported into the recovery tank 80 where the liquid and air are separated. A vacuum is created in the recovery tank 80 by the suction motor 81, which draws air from the recovery tank 80 and exhausts the air to the carpeted surface.

A user interface module 200 is provided on the handle 62 to allow the user to select additional options on the extractor 60 to clean the surface. These options include distributing an amount of cleaning solution based on the speed of the base assembly 64 moving across the cleaning surface, controlling the speed of the scrub brushes 72 scrubbing the surface, and controlling the suction motor 81 to vary the amount of suction based on the speed of the base assembly 64 moving across the surface. Other options can also be incorporated into module. The module 200 can be in the form of a touch screen having touch sensors to select the options, or the module could comprise pushbuttons, rotary switches, or other suitable means to select the options. A controller 202 is electrically connected to the module 200 for receiving a signal from the module 200 representing the selected option.

Figure 3:
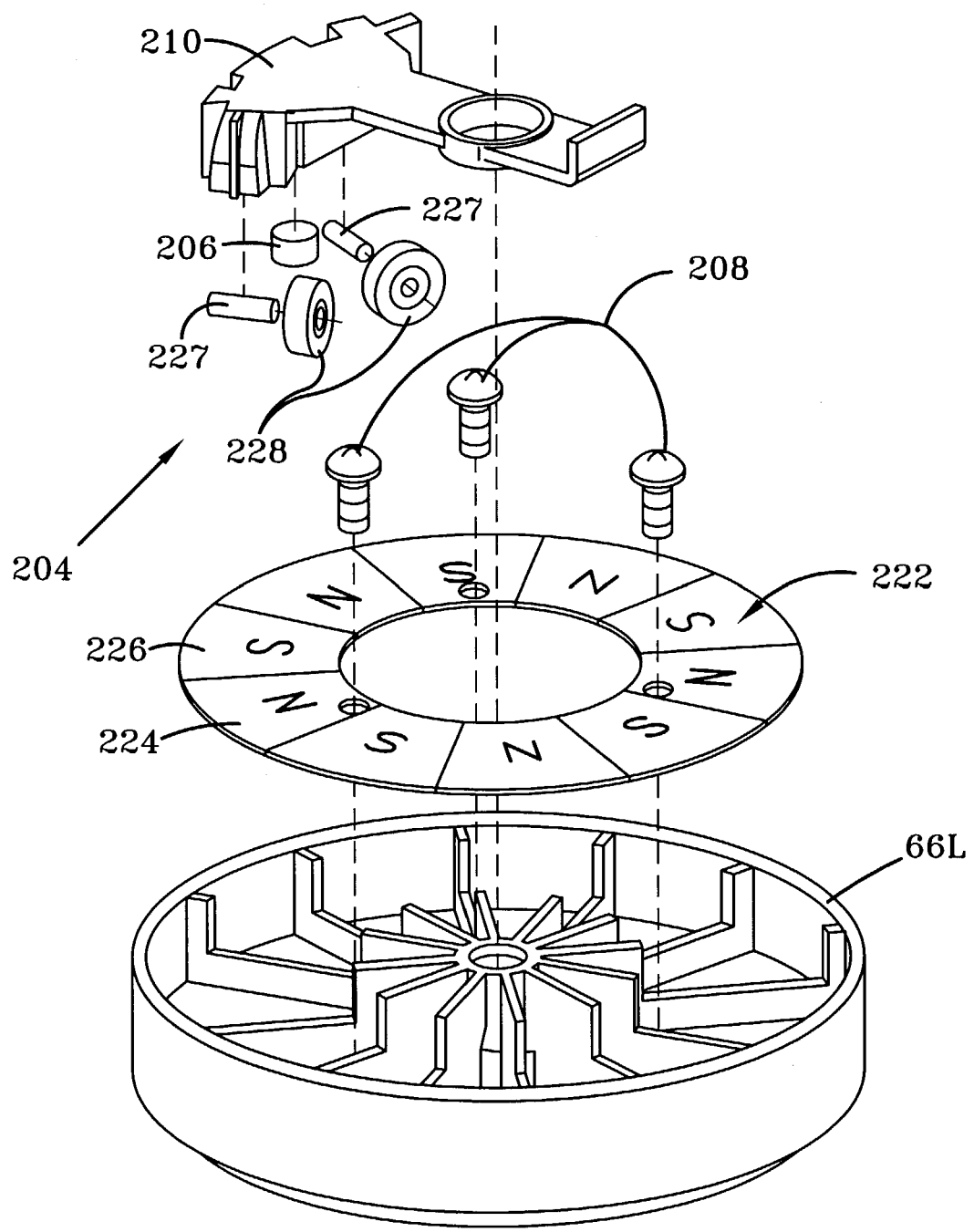
FIG. 3 is an exploded view of the speed sensor of the present invention of the embodiment of FIG. 1.

A speed sensor 204 is also electrically connected to the controller 202 and outputs a signal representative of the speed of the base assembly 64 with respect to the cleaning surface. FIG. 3 shows in more detail the speed sensor 204 and related parts. The speed sensor 204 includes a hall sensor 206 secured to an arm 210 and positioned spacedly adjacent a magnetic disk 222 mounted to the rear extractor wheel 66L by screws 208 or other suitable means such as for example, adhesive. The magnetic disk 222 can also be keyed to securely fit into a complimentary configured axle. The magnetic disk 222 has a multiple of alternating pie-shaped segments of opposite polarity such as the north and south segments 224, 226 as shown. As the wheel 66L rotates when rolled over the cleaning surface, the magnetic disk 222 rotates with it. The arm 210 includes axles 227 with rollers 228 that ride on the magnetic disk 222 to ensure clearance between the hall sensor 206 and the magnetic disk 222.

Figure 4:
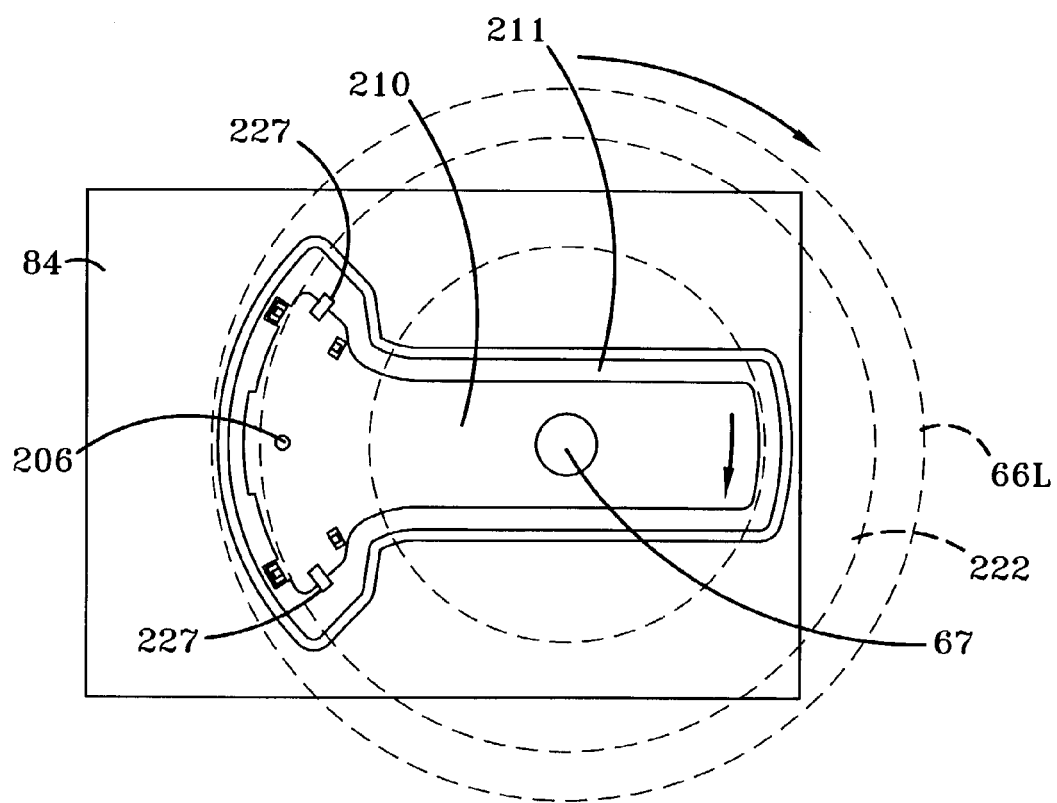
FIG. 4 is a partial left side view of the base of the carpet extractor of FIG. 1 showing the speed sensor of FIG. 3.

As seen in FIG. 4, the rear extractor wheel 66L includes an axle 67 that slidably extends through an opening in the arm 210 and rotates within the opening. The arm 210 is further positioned in a recess 211 of the frame or body 84 so that the arm 210 and hall sensor 206 remain stationary while the axle 67 rotates as the base assembly 64 moves along the cleaning surface. The hall sensor 206 is electrically connected to the controller 202. Alternatively, the hall sensor 206 can be mounted on the body 84.

As the magnetic disk rotates, the hall sensor 206 breaks into the positive gauss of the magnetic field of the North Pole thereby causing the hall sensor 206 to output a pulsed signal, which is representative of the rotation speed of the wheel 66L, to the controller 202. Optionally, a commonly known RC network can adjust the signal to a proportional output voltage type before it is inputted into the controller. The speed sensor 204 can also be an infrared or optical sensor or other suitable type of sensor.

The outputs of the controller 202 are electrically connected to the pump 808, the mixing valve 796, brush motor 73, and suction motor 81. Additional outputs of the controller 202 can be incorporated and electrically connected to other devices on the extractor 60 such as one for controlling the amount of pressure exerted by the brush assembly 70 on the cleaning surface. Also, other devices that detect an operating characteristic of the carpet extractor 60 can be electrically connected to additional inputs of the controller 202.

The controller 202 first determines what option was selected by comparing the option signal outputted by the module 200 and data stored in the controller 202. If the controller 202 receives the option signal representing distributing an amount of cleaning solution based on the speed of the base assembly 64 moving across the cleaning surface, the controller 202 compares the speed signal from the speed sensor 204 with the data stored in it. The controller 202 then outputs a pulse width modulated control signal to the pump 808, which controls the amount of cleaning solution flowing to the distributor 792 based on that speed signal. For this option, the controller 202 is programmed to control the pump 808 so that the amount of cleaning solution flowing to the distributor 792 increases in proportion to the speed of the base assembly 64 moving along the surface. A driver 232 is electrically connected between an output of the controller and power switching device 234, which is electrically connected to the pump 808. Upon receiving the control signal from the controller, the driver 232 adjusts the voltage to a proper value for input to the power switching device 234 which switches on and off the controls of the motor in the pump 808, thereby controlling the amount of cleaning solution flowing to the distributor 792.

If the controller 202 receives the option signal representing setting the speed of the brushes 72 scrubbing the cleaning surface based on the speed of the base assembly 64 moving across the cleaning surface, the controller 202 compares the speed signal from the speed sensor 204 with data stored in it. The controller 202 then outputs a pulse width modulated control signal to the brush motor 73, which controls the speed of the brushes 72 scrubbing the cleaning surface based on the speed signal. A driver 236 is electrically connected between an output of the controller 202 and power switching device 238, which is electrically connect to the brush motor 73. For this option, the controller 202 is programmed to control the brush motor 73 so that the rotary speed of the brushes 72 scrubbing the cleaning surface increases in proportion to the speed of the base assembly 64 moving along the cleaning surface. Upon receiving the control signal from the controller 202, the driver adjust the voltage to the proper value for input to the power switching device 238, which switches on and of the controls of the brush motor 73 thereby controlling the rotational speed of the brushes 72 scrubbing the cleaning surface.

If the controller 202 receives the option signal representing setting the speed of the suction motor 81 based on the speed of the base assembly 64 moving across the cleaning surface, the controller 202 compares the speed signal from the speed sensor 204 with data stored in it. The controller 202 then outputs a pulse width modulated control signal to the suction motor 81. A driver 240 is electrically connected between an output of the controller 202 and power switching device 242, which is electrically connect to the suction motor 81. For this option, the controller 202 is programmed to control the suction motor 81 so that the speed of the suction motor 81 generating suction increase in proportion to the speed of the base assembly 64 moving along the cleaning surface. Upon receiving the control signal from the controller 202, the driver 240 adjust the voltage to the proper value for input to the power switching device 242, which switches on and off the controls of the suction motor 81 thereby controlling the amount of suction generation or power related to the speed of the suction motor 81.

If the controller 202 receives the option signal representing setting of the mixing valve 796 based on the speed of the base assembly 64 moving across the cleaning surface, the controller 202 compares the speed signal from the speed sensor 204 with data stored in it. The controller 202 then outputs a pulse width modulated control signal to the mixing valve 244. A driver 244 is electrically connected between an output of the controller 202 and valve controller 246, which is electrically connect to the mixing valve 796. For this option, the controller 202 is programmed to control the mixing valve 796 so that the proportion of detergent in cleaning solution increases in proportion to the speed of the base assembly 64 moving along the cleaning surface. Upon receiving the control signal from the controller 202, the driver 244 adjusts the voltage to the proper value for input to the valve controller 246, which controls the mixing valve 796 to adjust the mixing ratio of detergent and water.

Figure 5:
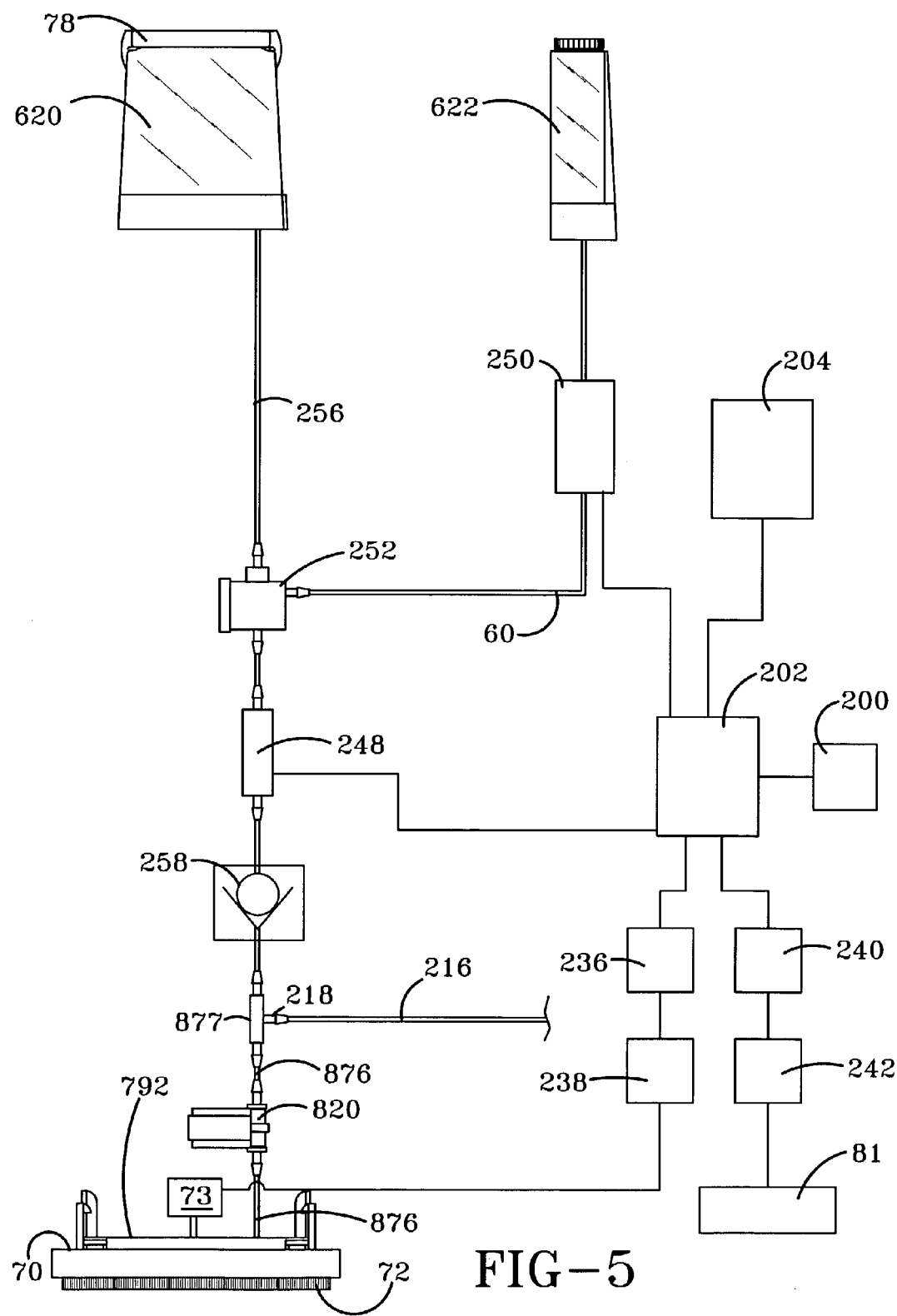
FIG. 5 is a schematic view of the fluid distribution system and control system of a second embodiment of the present invention.

In a second embodiment of the invention as shown in FIG. 5, two pumps 248, 250 are used to draw the cleaning solution to the distributor 792. Components from the previous embodiment shown in FIGS. 1 through 4, which are identical in structure and have identical functions will be identified by the same reference numbers. In this embodiment, one pump 248 for the clean water tank 620 is fluidly connected between the clean water tank 620 and distributor 792. The other pump 250 for the detergent tank 622 is fluidly connected via conduit 260 between a Tee 252 provided in the conduit 256 connecting the water pump 248 and clean water tank 620. The pumps 248, 250 are gear pumps but they can be also centrifugal pumps or other suitable type pumps. The controller 202 is electrically connected to each of the pumps 248, 250 at one or more of its outlets. A check valve 258 is provided in the conduit 256 connecting the outlet of the water pump 248.

If the controller 202 receives the option signal representing controlling the pumps 248, 250 to pump the amount of detergent and/or clean water based on the speed of the base assembly 64 moving across the cleaning surface, the controller 202 compares the speed signal from the speed sensor 204 with data stored in it. The controller 202 then outputs pulse width modulated control signal(s) to the pumps 248, 250. For this option, the controller 202 is programmed to control the pumps 248, 250 so that the proportion of detergent in cleaning solution increases in proportion to the speed of the base assembly 64 moving along the cleaning surface. Also, the pumps 248, 250 can control the amount of mixed cleaning solution based on the speed of the base assembly 64 moving across the surface, if the user selected such an option signal. Further, if desired, the user can increases or decrease the amount of cleaning solution on the module 200 irrespective of the speed of the base assembly 64 across the cleaning surface. The controller 202 can be a microprocessor or an analog circuit. The power switching devices can be field effect transistors, triacs or other suitable power switching devices.

In addition to speed, the speed sensor 204 could also detect the forward or rearward direction of movement of the extractor 60 and output such a signal to the controller 202. In this situation, the controller 202 compares the signal with stored data and outputs one or more control signals to the various devices (such as the brush motor 73, suction motor 81, and pump 808 or pumps 248, 250) to control their functions. For example, if the speed sensor 204 outputs a signal indicating that the extractor 60 is moving in the rearward direction, the controller sends a control signal to the valve controller 246 to control the mixing valve 796 to allow only clean water to flow to the distributor 792. If the second embodiment is used in this example, upon the speed sensor 204 detecting the rearward direction of the extractor 60, the controller 202 sends a control signal to the detergent pump 250 to turn it off to allow only clean water to flow to the distributor 792. Additionally, upon the speed sensor 204 detecting the rearward direction of the extractor 60, the controller 202 sends a control signal to the brush motor 73 to reverse the rotational direction of the brushes 72 agitating the surface so that the brushes 72 scrub the surface of the cleaning path in both the clockwise and counter clockwise direction when the extractor 60 is moved forward and rearward over the cleaning path.

Optionally, a speed sensor can be operatively associated with the brush assembly 70 and controller 202 to detect the speed of the brushes 72 (or brush roll) agitating the surface and output a speed signal representative of that agitating speed to the controller 202. The controller 202 compares the signal with stored data and outputs one or more control signals to the various devices (such as the valve controller 246, brush motor 73, suction motor 81, and pump 808 or pumps 248, 250) to control their functions as previously described based on the speed of the brush assembly 70 agitating the surface.

The present invention has been described by way of example using the illustrated embodiments. Upon reviewing the detailed description and the appended drawings, various modifications and variations of the embodiments will become apparent to one of ordinary skill in the art. All such obvious modifications and variations are intended to be included in the scope of the present invention and of the claims appended hereto.

In view of the above, it is intended that the present invention not be limited by the preceding disclosure of the embodiments, but rather be limited only by the appended claims.

What is claimed is:

1. A cleaning apparatus for cleaning a surface in which cleaning solution is distributed to the surface and substantially simultaneously extracted along with the dirt on the surface in a continuous operation as it moves along the surface comprising:
   a) a base assembly for movement along the surface, said base assembly having a front portion and a rear portion;
   b) a liquid distribution system associated with said base assembly and including:
      a first source providing a supply of said cleaning solution;
      a distributor fluidly connected to said first source for distributing said cleaning solution to the surface;
   c) a liquid recovery system associated with said base assembly and including:
      a suction nozzle having an inlet located at said front portion of said base assembly;
      a suction source in fluid communication with said suction nozzle for applying suction to draw the cleaning solution and dirt from the surface and through the suction nozzle;
   d) a detecting device for detecting the speed of the cleaning apparatus as it moves along the surface and producing a speed signal representing the speed of the cleaning apparatus relative to the surface;
   e) a controller operatively connected to said detecting device and said liquid distribution system, said controller controlling the amount of cleaning solution distributed to the surface based on said speed signal; and
   f) a handle pivotally connected to said base assembly, said recovery system including a recovery tank removably mounted to one of said handle and said base assembly, said recovery tank in fluid communication with said suction nozzle for collecting the cleaning solution and dirt drawn through the suction nozzle.

2. The cleaning apparatus of claim 1 wherein said liquid distribution system includes a pump fluidly connected between said first source and said distributor to draw under pressure a predetermined amount of said cleaning solution from said first source to said distributor based on the speed of the pump, said controller coupled to said pump to control the speed of the pump based on said speed signal.

3. The cleaning apparatus of claim 2 including a user interface system operatively connected to said pump, said user interface system including a selector for selecting at least one of a first constant speed of the pump irrespective of the speed signal, a second constant speed of the pump irrespective of the speed signal, and a third speed of the pump based on said speed signal.

4. The cleaning apparatus of claim 1 including at least two wheels rotatably mounted to said base assembly for supporting said base assembly, said detector being operatively connected to at least one of said wheels such that said detector detects the rotational speed of the at least one wheel as the cleaning apparatus moves along the surface.

5. The cleaning apparatus of claim 4 wherein said detector includes a first member mounted to said at least one wheel for rotation therewith, said detector including a second member mounted to said base assembly and operatively associated with said first member to produce said speed signal.

6. The cleaning apparatus of claim 5 wherein said first member comprises a magnetic disk, said second member comprising a hall sensor.

7. The cleaning apparatus of claim 6 including an output device mounted on the cleaning apparatus and operatively connected to the detector for indicating the speed of the cleaning apparatus relative to the surface.

8. The cleaning apparatus of claim 6 wherein said magnetic disk includes alternating opposite polarity magnetic portions.

9. The cleaning apparatus of claim 1 including an agitator operatively connected to said base assembly, wherein said controller is operatively connected to said agitator for controlling the speed of said agitator agitating the surface relative to the base assembly based on said speed signal.

10. A cleaning apparatus for cleaning a surface in which cleaning solution is distributed to the surface and substantially simultaneously extracted along with the dirt on the surface in a continuous operation as it moves along the surface comprising:
 a) a base assembly for movement along the surface, said base assembly having a front portion and a rear portion;
 b) a liquid distribution system associated with said base assembly and including:
  a first source providing a supply of said cleaning solution;
  a distributor fluidly connected to said first source for distributing said cleaning solution to the surface;
 c) a liquid recovery system associated with said base assembly and including:
  a suction nozzle having an inlet located at said front portion of said base assembly;
  a suction source in fluid communication with said suction nozzle for applying suction to draw the cleaning solution and dirt from the surface and through the suction nozzle;
 d) a detecting device for detecting the speed of the cleaning apparatus as it moves along the surface and producing a speed signal representing the speed of the cleaning apparatus relative to the surface;
 e) a controller operatively connected to said detecting device and said liquid distribution system, said controller controlling the amount of cleaning solution distributed to the surface based on said speed signal; and
 f) wherein said first source provides a supply of a first liquid, said liquid distribution system further including a second source providing a supply of a second liquid, said cleaning solution being comprised of said first liquid mixed with said second liquid, a mixing control system for adjusting the mix ratio of the first liquid with the second liquid, a controller operatively connected to said detecting device and said mixing control system, said controller controlling the mix ratio of the first liquid with the second liquid in said cleaning solution based on said speed signal.

11. A cleaning apparatus for cleaning a surface in which cleaning solution is distributed to the surface and substantially simultaneously extracted along with the dirt on the surface in a continuous operation as it moves along the surface comprising:
 a) a base assembly for movement along the surface;
 b) a liquid distribution system associated with said base assembly and including:
  a source providing a supply of said cleaning solution;
  a distributor fluidly connected to said source for distributing said cleaning solution to the surface;
  an agitator operatively connected to said base assembly;
 c) a liquid recovery system associated with said base assembly and including:
  a suction nozzle;
  a suction source in fluid communication with said suction nozzle for applying suction to draw the cleaning solution and dirt from the surface and through the suction nozzle;
 d) a detecting device for detecting the speed of the cleaning apparatus as it moves along the surface and producing a speed signal representing the speed of the cleaning apparatus relative to the surface;
 e) a controller operatively connected to said detecting device and said agitator, said controller controlling the speed of said agitator agitating the surface relative to the base assembly based on said speed; and
 f) a handle pivotally connected to said base assembly, said recovery system including a recovery tank removably mounted to one of said handle and said base assembly, said recovery tank in fluid communication with said suction nozzle for collecting the cleaning solution and dirt drawn through the suction nozzle.

12. The cleaning apparatus of claim 11 including a user interface system operatively connected to said agitator, said user interface system including a selector for selecting at least one of a first constant agitating speed of said agitator irrespective of the speed signal, a second constant agitating speed of the agitator irrespective of the speed signal, and a third agitating speed of the agitator based on said speed signal.

13. The cleaning apparatus of claim 11 including at least two wheels rotatably mounted to said base assembly for supporting said base assembly, said detector being operatively connected to at least one of said wheels such that said detector detects the rotational speed of the at least one wheel as the cleaning apparatus moves along the surface.

14. The cleaning apparatus of claim 13 wherein said detector includes a first member mounted to said at least one wheel for rotation therewith, said detector including a second member mounted to said base assembly and operatively associated with said first member to produce said speed signal.

15. The cleaning apparatus of claim 14 wherein said first member comprises a magnetic disk, said second member comprising a hall sensor.

16. The cleaning apparatus of claim 15 including an output device mounted on the cleaning apparatus and operatively connected to the detector for indicating the speed of the cleaning apparatus relative to the surface.

17. The cleaning apparatus of claim 15 wherein said magnetic disk includes alternating opposite polarity magnetic portions.

18. A method of cleaning a surface with a carpet extractor comprising the steps of:
 a) moving the carpet extractor along a surface;
 b) detecting a speed of the carpet extractor;
 c) mixing a first liquid and a second liquid in the carpet extractor to form a cleaning solution;
 d) controlling a mix ratio of said first liquid and said second liquid based on the speed of the carpet extractor; and
 e) distributing said cleaning solution from the carpet extractor onto the surface.

19. The method of claim 18 wherein said carpet extractor includes a handle pivotally connected thereto, wherein said handle is pivoted in an incline position while moving the carpet extractor along the surface.

20. The method of claim 18 wherein the operating characteristic is the speed of the carpet extractor moving along the surface.

21. The method of claim 20 including the step of agitating the surface wherein the speed of agitation is controlled based on the speed of the carpet extractor moving along the surface.

22. The method of claim 20 wherein the detecting step includes detecting the rotational speed of one of said wheels using a hall sensor.

* * * * *